(12) United States Patent
Sathyadevan et al.

(10) Patent No.: US 9,710,664 B2
(45) Date of Patent: Jul. 18, 2017

(54) SECURITY LAYER AND METHODS FOR PROTECTING TENANT DATA IN A CLOUD-MEDIATED COMPUTING NETWORK

(75) Inventors: Shiju Sathyadevan, Kerala, IN (US); P. Venkat Rangan, Coimbatore, IN (US); Krishnashree Achuthan, Kerala, IN (US)

(73) Assignee: Amrita Vishwa Vidyapeetham, Castro Valley, CA (US)

( * ) Notice: Subject to any disclaimer, the term of this patent is extended or adjusted under 35 U.S.C. 154(b) by 134 days.

(21) Appl. No.: 13/606,979

(22) Filed: Sep. 7, 2012

(65) Prior Publication Data

US 2014/0075568 A1 Mar. 13, 2014

(51) Int. Cl.
*G06F 7/04* (2006.01)
*G06F 21/62* (2013.01)
*G06F 21/55* (2013.01)
*G06F 17/30* (2006.01)

(52) U.S. Cl.
CPC ........ *G06F 21/6218* (2013.01); *G06F 21/554* (2013.01)

(58) Field of Classification Search
CPC ............... H04L 63/0807; H04L 9/3234; H04L 63/0823; H04L 9/3268; G06F 2009/45587; G06F 21/00; G06F 21/445; G06F 21/575; G06F 9/45558
USPC ........................................................ 726/27
See application file for complete search history.

(56) References Cited

U.S. PATENT DOCUMENTS

| 7,613,700 | B1 * | 11/2009 | Lobo ................. G06F 17/30943 |
| 8,417,723 | B1 * | 4/2013 | Lissack et al. ............... 707/781 |
| 2003/0174649 | A1 * | 9/2003 | Shankar .............. H04L 12/2898 370/235 |
| 2003/0187966 | A1 * | 10/2003 | Sinha .................. G06Q 10/0637 709/223 |
| 2006/0195401 | A1 * | 8/2006 | Davis ...................... G06F 21/33 705/50 |
| 2008/0141333 | A1 * | 6/2008 | Chen ................... G06F 21/6218 726/1 |
| 2009/0138951 | A1 | 5/2009 | Birk et al. |
| 2009/0183010 | A1 | 7/2009 | Schnell et al. |

(Continued)

FOREIGN PATENT DOCUMENTS

KR 1020120064213 A 6/2012
WO 2011057983 A1 5/2011

*Primary Examiner* — Gary Gracia
(74) *Attorney, Agent, or Firm* — Donald R. Boys; Central Coast Patent Agency, Inc.

(57) ABSTRACT

A system for protecting data managed in a cloud-computing network from malicious data operations includes an Internet-connected server and software executing on the server from a non-transitory physical medium, the software providing a first function for generating one or more security tokens that validate one or more computing operations to be performed on the data, a second function for generating a hash for each token generated, the hash detailing, in a secure fashion, the operation type or types permitted by the one or more tokens, a third function for brokering two-party signature of the one or more tokens, and a fourth function for dynamically activating the one or more signed tokens for a specific time window required to perform the operations permitted by the token.

15 Claims, 7 Drawing Sheets

(56) References Cited

U.S. PATENT DOCUMENTS

| | | | |
|---|---|---|---|
| 2010/0125612 A1* | 5/2010 | Amradkar | H04L 63/105 707/802 |
| 2010/0286992 A1* | 11/2010 | Tkatch | G06Q 30/00 705/1.1 |
| 2011/0099384 A1* | 4/2011 | Grange | H04L 9/0897 713/184 |
| 2011/0283110 A1* | 11/2011 | Dapkus et al. | 713/182 |
| 2011/0307947 A1 | 12/2011 | Kariv et al. | |
| 2012/0096525 A1* | 4/2012 | Bolgert | G06F 11/3065 726/6 |
| 2012/0102153 A1* | 4/2012 | Kemp et al. | 709/219 |
| 2012/0130781 A1* | 5/2012 | Li | 705/14.4 |
| 2012/0144501 A1* | 6/2012 | Vangpat | H04L 63/108 726/28 |
| 2012/0215918 A1* | 8/2012 | Vasters | H04L 67/02 709/226 |
| 2012/0254957 A1* | 10/2012 | Fork et al. | 726/6 |
| 2012/0297381 A1* | 11/2012 | Ambat | G06F 9/45558 718/1 |
| 2012/0323509 A1* | 12/2012 | Chen | G06F 1/28 702/60 |
| 2012/0324072 A1* | 12/2012 | Sartini | G06F 9/50 709/223 |
| 2012/0331125 A1* | 12/2012 | Li | G06F 9/50 709/224 |
| 2012/0331518 A1* | 12/2012 | Lee | 726/1 |
| 2013/0003538 A1* | 1/2013 | Greenberg | H04L 47/12 370/230 |
| 2013/0047266 A1* | 2/2013 | Radhakrishnan | H04L 63/0807 726/28 |
| 2013/0111558 A1* | 5/2013 | Sangubhatla et al. | 726/4 |
| 2013/0117564 A1* | 5/2013 | Chang | G06F 9/45558 713/168 |
| 2013/0117567 A1* | 5/2013 | Chang | G06F 9/45558 713/170 |
| 2013/0139241 A1* | 5/2013 | Leeder | 726/9 |
| 2013/0263208 A1* | 10/2013 | Challa | 726/1 |
| 2013/0340093 A1* | 12/2013 | Reinertsen | G06F 21/10 726/28 |
| 2013/0347125 A1* | 12/2013 | Rezlan | H04L 63/107 726/27 |
| 2014/0026191 A1* | 1/2014 | Jain et al. | 726/4 |
| 2014/0068743 A1* | 3/2014 | Marcus et al. | 726/8 |

* cited by examiner

SECURITY LAYER AND METHODS FOR PROTECTING TENANT DATA IN A CLOUD-MEDIATED COMPUTING NETWORK

CROSS-REFERENCE TO RELATED DOCUMENTS

NA

BACKGROUND OF THE INVENTION

1. Field of the Invention

The present invention is in the field of distributed computing including cloud-mediated computing networks and pertains particularly to methods and apparatus for securing tenant data against malicious operations.

2. Discussion of the State of the Art

A cloud-mediated computing network is a network-accessible distributed computing platform used by companies to provide network-based data management solutions for businesses to manage their own data and data belonging to their clients. The distributed computing model is attractive to organizations from startups to large multinational corporations that seek computing alternatives that enable them to reduce computing costs, maintenance overhead, and to gain computing power on demand.

It is desired that such computing resources provide flawless, secure, and negative latency computational power with little or no downtime. While external security measures instituted on cloud-based computing networks are adequate for most personal and industrial uses, tenants desire more control over the operations that are performed on their proprietary and mission critical data. Current controls in place for most cloud-based networks such as process auditing, event logging, and sharing of logs with cloud tenants are not sufficiently secure for larger institutions that manage critical and highly sensitive data. To wit, larger corporations favor private cloud-networks tailored to accommodate global needs of large corporate houses confining the cloud technology within their corporate backbones.

Providers of public cloud-computing based on models such as the Infrastructure as a Service (IaaS) model have identified a lack of trust of external entities and a fact that tenants currently have little or no control over mission critical data at premises outside the provider organization's domain perimeter as among key reasons for a sluggish adoption rate for tenants subscribing to cloud-mediated computing.

In current practice, clients must entrust the service provider with all its business intelligence (in the form of data) and computing infrastructure (in terms of hardware and other supporting operational software and applications) and expects its data to be preserved, protected, serviced properly, and respected for its value. To be fair, most service providing organizations do have a higher level of security in place than normal enterprise security regimens. These measures help address key areas of security by satisfying the norms put forth by current security standards. For example, data are encrypted when in transit and while in storage to ensure that it is not intercepted and decoded.

A challenge to encryption is that it may not be practically applied to extremely large data sets or for certain types of data intense operations. One reason for this is that many current databases require a non-encrypted state to render the data searchable for extraction and distribution operations resulting from database queries. Moreover, adequate monitors are in place to capture and plug identified vulnerabilities and to raise appropriate alarms in order to initiate immediate corrective actions. However, such procedural methods in place within most cloud-mediated service networks will not prevent malicious attacks from happening. They simply provide indication that malicious actions have occurred and may help with tracing such malicious activity back to its origin and preventing future acts from that source as a temporary solution.

Therefore, what is currently needed in the art is a security layer and methods that will empower cloud tenants in efforts to control how their data is accessed and serviced at the provider's facilities. A solution such as this will offer cloud-computing tenants a higher degree of confidence and assurance about the confidentiality, integrity, and security of the services that are consumed.

SUMMARY OF THE INVENTION

The problem stated above is that complete trust is desirable for tenants subscribing to public or privately offered cloud-mediated computing services, but many of the conventional means for creating complete trust, such as secure encryption of data and industry-tested firewalls, do not address trust issues relative to some internally-based security threats. The inventors therefore considered functional components of a cloud-based computing network, looking for elements that exhibit potential for interoperability that could potentially be harnessed to provide trust measures that enforce trust of internal operatives but in a manner that would not require significant computational resources or create more network latency.

Every cloud-mediated computing network is dependant on trust that tenants place toward the network architecture and service-provider operators, one by-product of which is an abundance of loyal tenants subscribing to offered services. All cloud-mediated computing networks employ data servers and software applications to conduct the permitted data operations relative to tenants secure data, and data servers executing software are typically a part of such apparatus.

The present inventor realized in an inventive moment that if, during normal servicing of cloud-mediated data, operations requested on data could be validated internally and be permitted only for time periods required to perform such operations, significant improvement in security against malicious intent spawned from within the network domain might result. The inventor therefore constructed a unique security layer and methods for protecting tenant data from malicious internal threats that allowed tenants more control over their data while constraining operations on data to those operations that are pre-negotiated between the service provider and the tenant and limiting the life cycle of those operations to operation windows deemed sufficient for performing those operations. A significant improvement in internal security of tenant data against malicious intent results, with no impediment to operational task requirement or network latency created.

Accordingly, in one embodiment of the present invention, a system for protecting data managed in a cloud-computing network from malicious data operations is provided including an Internet-connected server and software executing on the server from a non-transitory physical medium, the software providing a first function for generating one or more security tokens that validate one or more computing operations to be performed on the data, a second function for generating a hash for each token generated, the hash detailing, in a secure fashion, the operation type or types permitted by the one or more tokens, a third function for brokering two-party signature of the one or more tokens, and a fourth function for dynamically activating the one or more signed tokens for a specific time window required to perform the operations permitted by the token.

In one embodiment, the cloud-computing network is a public network based on an Infrastructure as a Service (IaaS) model. In a preferred embodiment, the system is implemented in a virtual machine monitoring layer. In this embodiment, the system is further integrated into a Dom0 kernel. In a preferred embodiment, the available computing operations attributed to the one or more generated tokens are pre-defined attributes of a parent object, the operations agreed to in a service level agreement (SLA) between a cloud computing tenant and a cloud computing service provider.

In one embodiment, the one or more generated tokens are stored in an inactive and signed state until they are required to validate a requested operation. In one embodiment, one or more of the tokens are reusable tokens that are uniquely identified at each instance of use. In one embodiment, one or more tokens are dynamically generated upon request of a cloud service administrator or cloud tenant for performance of one or more data operations outside of a current SLA. In a variation of this embodiment, the one or more dynamically generated tokens are added to a token storage space containing the pre-negotiated tokens, the one or more tokens incorporating one or more new operations into the SLA as one or more updates.

In a preferred embodiment, the one or more tokens are signed using privately held keys. In one embodiment, the hash of a token is compared to an embedded hash value to validate the content and operation integrity of the token before activation for use. In one embodiment, the system includes a fifth function for validating one or more tokens for operation against pre-negotiated list of permitted operations in the SLA policy governing the provider/tenant relationship.

According to an aspect of the present invention, a method is provided for securing against internal malicious operations against data stored on a cloud-computing network. The method includes the steps (a) generating one or more security tokens that validate one or more computing operations permitted on the data, the operations listed in a pre-negotiated service level agreement between a tenant and service provider of the cloud computing network, (b) generating hashes for the one or more security tokens, the hashes validating the integrity of each token relevant to the operation or operations that each token permits, (c) signing the one or more tokens using encryption keys privately held by the tenant and the service provider, (d) upon request, activating one or more of the tokens to initiate one or more computing operations permitted on the data.

In a preferred aspect of the method, the cloud-computing network is a public/private/hybrid network based on an Infrastructure as a Service (IaaS) model. Also in a preferred aspect, the available computing operations attributed to the one or more generated tokens are pre-defined attributes of a parent object, the operations agreed to in a service level agreement (SLA) between a cloud computing tenant and a cloud computing service provider. In one aspect, the one or more generated tokens are stored in an inactive and signed state until they are required to validate a requested operation.

According to another aspect of the present invention, a method is provided for using a token object to authenticate one or more computing operations requested to be performed on cloud-mediated data. The method includes the steps (a) performing a lookup in a secure object database for a token object that permits the operation or operations that are subject of a received request to perform the one or more computing operations, (b) in the event a relevant token is not found, generating and sending a system notification, (c) in the event a relevant token is found, generating a temporary ID for the token, (d) validating the operational integrity of the token, (e) activating the token for a period of time representing a time frame within which the data operation or operations must be completed, and (f) destroying or deactivating and storing the token after the stated operations are completed.

In one aspect of the method, in step (b), the system notification is sent to a tenant interface operated as a control dashboard interface. In a preferred aspect, in step (d), the operational integrity of the token is validated by comparing hash values. In another aspect, in step (f) the deactivated token is reusable for the same operation or operations it permits.

BRIEF DESCRIPTION OF THE DRAWING FIGURES

DETAILED DESCRIPTION

The inventors provide a system and methods for protecting data managed in a cloud-computing network from malicious data operations that enables cloud tenants better control over what operations can be performed on their data, who can perform those operations, and when those operations are permitted. The present invention will be described in enabling detail using the following examples, which may describe more than one relevant embodiment falling within the scope of the present invention.

Figure 1:
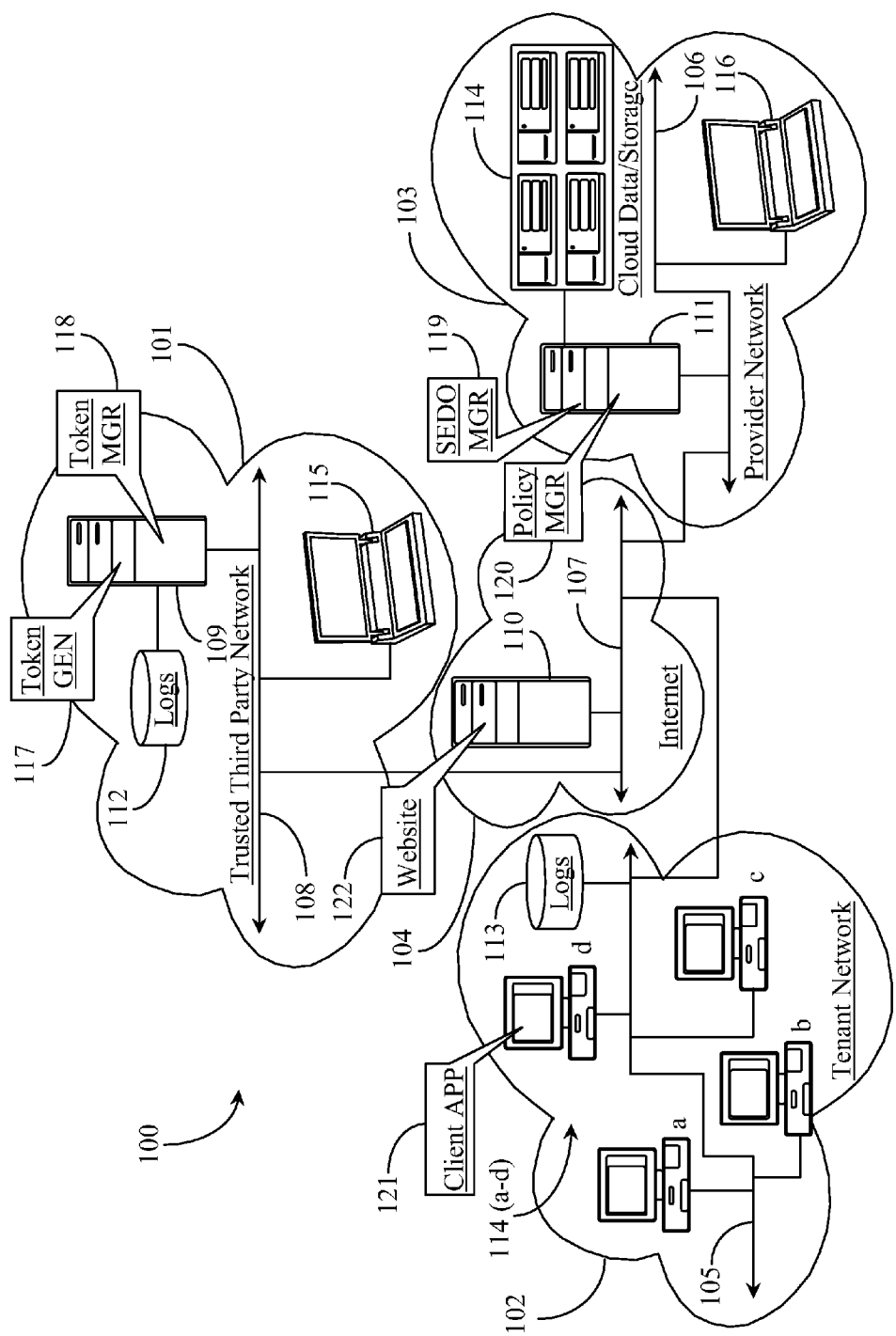
FIG. 1 is an architectural overview of a cloud-mediated data network that supports secure token authentication for operations performed on cloud data according to an embodiment of the present invention.

FIG. 1 is an architectural overview of a cloud-mediated data network 100 that supports secure token authentication for operations performed on cloud data according to an embodiment of the present invention. Data network 100 includes a trusted third-party data network 101. Data network 101 may be a corporate wide area network (WAN) or local area network (LAN), or some other secured data network managed by a third party trusted provider of certain security elements related to the present invention. More specifically, the trusted third-party may be a company that provides security-enabled data objects (SEDO), a term coined by the inventors to describe a token generated from a parent SEDO object model. Third-party trusted network 101 is not specifically required in order to practice the present invention. In one embodiment, the third party is simply a secure and trusted party that both cloud-computing tenants and a cloud-computing service provider entity trusts to generate security tokens, also referred to herein as secure intelligent tokens (SITs).

Data network 100 includes a cloud-computing tenant network 102. Tenant network 102 represents any wired or wireless data network that may support access to cloud computing for one or more connected computing appliances. Computing appliances 114 a-d represent cloud-computing client devices having connection to cloud-based services provided by a cloud-computing service providing entity. Data network 100 further includes a provider network 103. Provider network 103 represents any wired and or wirelessly accessible data network secured for provision of cloud-mitigated computing or "cloud computing" as it is referred to in the art. In this embodiment, trusted third-party data network 101, tenant network 102, and provider network 103 are interconnected by the Internet network, illustrated herein as Internet network 104.

Internet network 104 includes a network backbone 107. Network backbone 107 represents all of the lines, equipment, and access points that make up the Internet network as a whole, including connected sub-networks. Therefore, there are no geographic limitations to practice of the present invention. Internet backbone 107 supports a web server 110. Web server 110 includes a non-transitory physical medium that contains all of the data and software required to enable function as a web server. Any third-party web hosting service (not illustrated) may host web server 110. In one embodiment, web server 110 is maintained by the service provider and may be hosted within the network domain of the service provider or within network 103 without departing from the spirit and scope of the present invention.

Web server 110 hosts a website 122. The cloud-computing service-providing entity operating service provider network 103 maintains website 122. Website 122 represents an access point for potential cloud-computing tenants such as those operating computing appliances 114 (a-d). Tenants operating computing appliances 114 (a-d) may access website 122 and register for cloud-computing services offered by the service providing entity through provider network 103. In one embodiment, web sever 110 includes a proxy server that provides proxy service access to cloud-computing services offered through provider network 103. Such tenants as part of negotiating cloud services, may agree upon and sign a service level agreement (SLA). The SLA defines all service provisions, service levels, and details what specific data operations are permitted to be performed on tenant cloud data and who may perform those operations.

Tenants operating computing appliances 114 (a-d) may connect to website 122 on web server 110 and may access and download a client application 121. Client application 121, illustrated on computing appliance 114 (d), may include a client interface application or "dashboard" control interface. Such an interface may reside on and be executed from a computing appliance to enable active network interface with cloud-based services offered through provider network 103. Tenants may control and manage many aspects of the cloud-computing services through client application 121 including but not limited to authorizing special ad-hoc cloud-computing requests received from cloud tenants. In another embodiment, application 121 may reside on web server 110 or on another machine accessible over the network. Computing appliances 114 (a-d) may be desktop, laptop, or notebook computing appliances, android devices, smart phones, iPAD devices, or any computing appliance capable of Internet connection, navigation, and networking.

Provider network 103 includes a network backbone 106. Network backbone 106 represents all of the lines, equipment, and access points that make up provider network 103. Provider network 103 may be any corporate or private network that has connection to Internet network 104 through which provider services may be made available to the public at large. In this embodiment, provider network backbone 106 supports a data server 111. Server 111 includes a non-transitory medium containing all of the data and software required to enable function as a data server. Data server 111 provides access to cloud-computing resources for tenants operating appliances 114 (a-d). Server 111 may be accessed through application 121 in one embodiment. In one embodiment tenants are connected to a proxy server, which in turn provides connection to server 111.

A policy manager 120 is provided and illustrated in this example as residing on server 111. Policy manager 120 is a software application that manages SLA derived policy used to govern cloud-computing services tenant by tenant. In a preferred embodiment, cloud-computing tenants such as an organization, small business, or user group have a specific policy tailored to their cloud-computing needs. In one embodiment, a formalized SLA representing a service agreement between a tenant and a service provider is forwarded to a trusted third party like one operating through third-party network 101 so that information relative to service provision can be used to aid in the generation of secure intelligent tokens, also referred to herein as simply tokens. Secure encrypted policies may be generated based on SLA input and forwarded back to the service provider network for secure storage and maintenance.

Data server 111 includes a security enabled data object (SEDO) manager application 119. Application 119 provides one or more methods for using SITs to enable cloud-computing operations of tenant data according to policy-driven rules and constraints. SEDO manager 119 manages storage and access of secure intelligent tokens specifically designed to enable secure permissions for performing specific data operations on cloud data owned by tenants. Token management includes token storage, token access, and token validation processes. All of the data operations permitted on cloud data are defined by tokens generated for tenants based on SLA policy and rules. In this example, tokens are generated for use by a third party that is trusted by both the tenant and the service provider. Tokens may or may not be encrypted when stored for latter use. One token may define one or more data operations that may be performed under the SLA agreement and governed by a formalized secure policy definition. To prevent latency, tokens associated with all VM instances running on a particular node are stored locally.

Data server 111 has connection to cloud-computing resources 114 (cloud data/storage/hardware). Resources 114 include all of the hardware, software, and data storage facilities to enable a cloud-computing island or network. Resources 114 typically include numerous computing processor units (CPUs) and machines represented in a physical hardware layer, and virtual operating systems represented in a hypervisor layer analogous to a virtual machine layer. Provider network backbone 106 supports a network-connected computing appliance 116. Computing appliance 116 represents a terminal used by administration or the like to maintain and administer cloud services. In one embodiment, administrator 116 has direct access or access through an interface to a cloud-computing console (not illustrated) enabling an authorized administrator to perform administrative tasks and to submit operation requests to the system for performing operations on cloud-hosted data. In one embodiment, the cloud-computing network 103 is a public network based on an infrastructure as a service (IaaS) cloud-computing model. In other embodiments, aspects of the present invention may be practiced on private cloud-computing networks, or on hybrid networks without departing from the spirit and scope of the present invention. IaaS is the base model for platform as a service (PaaS) and for software as a service (SaaS).

In one embodiment of the present invention, token generation and intermediary post-generation management is performed by a trusted third party operating through network 101. However, it will be apparent to one with skill in the art that all of the software applications enabling functions of the invention may reside on and be executed from one server connected to the network or many servers connected to the Internet without departing from the spirit and scope of the present invention. Separation of software instances or components in this example is meant only to illustrate the separate domains of a service provider, a cloud-computing guest or tenant, and a third-party service providing actual token generation based on SLA provisions. In all embodiments, at least the SEDO management application 119 has components, which are tightly integrated within the cloud-computing hypervisor layer that brokers communication of operation requests to the cloud computing networks physical layer (114). More detail about software integration with cloud-components is described later in this specification.

Third-party network backbone 108 supports a data server 109. Data server 109 includes a non-transitory physical medium that contains all of the data and software required to enable function as a data server. Server 109 includes a software (SW) token generator 117. In one embodiment, SW 117 is adapted to accept formalized SLA data contained in an SLA agreement as data input in order to generate a machine-readable policy definition that outlines the particulars of data operations that are identified in the agreement and allowed according to policy of the agreement. Token generator 117 generates security enabled data objects (SEDOs), also referred to as tokens that provide secure access and permissions for the service provider to perform operations on the cloud data owned by that tenant covered under the policy.

Server 109 also hosts a token manager 118. Token manager 118 may provide encryption for generated tokens in one embodiment. Token manager 118 may broker tenant and provider signature of generated tokens, and may forward generated tokens for each tenant to a secure token storage facility (not illustrated) maintained by the service provider. In one embodiment, the policy definition governing all of the operations defined in the tokens is encrypted and sent to the service provider for secure storage with the tokens for each tenant. Server 109 includes a mass storage repository 112 that contains all of the records of events performed by the trusted third-party charged with token generation and encryption services. Backbone 108 supports an administration terminal 115 that represents a computing appliance used by an administrator to provide administration, routine maintenance, and other tasks relative to the third-party components in place for token generation and management.

In practice of the invention, a tenant such as one operating one or more of computing appliances 114 (*a-d*) connects to website 122 and registers for cloud-computing services. In the process, the tenant and service provider will form and agree to an SLA defining the scope of services offered and detailing all of the permitted operations that may be performed relative to the tenant's cloud data. The formalized (signed) SLA may then be forwarded to the trusted third-party service for generation of a machine-readable policy definition that governs permitted use for each token generated under the policy. All of the tokens required to define and permit each allowable data operation permitted under the policy are generated from a parent object model. The generated tokens are child instances of that model. In one embodiment, tokens are signed but not encrypted. In another embodiment, all generated tokens are encrypted at the third-party service. The token manager brokers signature of each generated token. Both the tenant and the service provider sign tokens using private keys. The token manager forwards the generated tokens and policies governing them to the service provider for secure storage.

In practice of the invention, the service provider services requests for operations on cloud data by looking in the policy and token store for the specific token and policy that permits the request. If the signed token exists and is permitted under the policy, the service provider extracts the token and queues it for processing. During processing, the token may be validated against possible tampering or file corruption through comparing hash values generated from the token's operation description to a pre-generated hash value embedded in the token data at the time it was generated. A token may be assigned an identification number for an active state. A time to live (TTL) may be pre-determined and activated for the token when the token is used. The TTL forces the operation(s) permitted by the token to be performed within the TTL window and the token becomes inactive or benign at the end of the TTL preventing further operation performance on the data.

In one embodiment a token is generated from an ad-hoc request for a data operation or operations that were not permitted in the original policy and for which no reusable tokens exist. Such tokens may be generated if both the service provider and tenant agree to permit the new data operation(s). In this embodiment, the token is generated, signed, and used in the same manner as pre-generated tokens. The tenant may elect for the newly generated token to become a reusable token if it is deemed that the operation(s) should become part of regular policy. In this case, the policy is modified to reflect the new data operation(s) that will be permitted regularly in the future. There may also be operations on data permitted by reusable tokens that the tenant desires to delete or eliminate from the policy. In this case, if both parties agree, tokens may be scraped eliminating certain operations from being performed on tenant data.

SEDO manager 119 is integrated with the hypervisor layer of the cloud computing platform and certain components are integrated into the operating system kernel to enable token-permitted operations. In empirical testing, the system of the invention is implemented on XEN as the Hypervisor or virtual machine layer and Ubuntu, a modified Linux Kernel representing Domain 0. The integration is required from a communications perspective where requests are trapped or queued for processing at the kernel and passed on to a hypervisor communications agent for implementation of the operations with respect to the physical hardware layer. In all embodiments, tenants receive alerts or notifications to their client dashboard application interfaces whenever requests do not match permitted operations or if any unauthorized requests are received. Token operation tampering, policy tampering, or malicious reordering of token operations or time constraints from within the service provider's network are revealed during policy check and hash comparison.

Tenant network backbone 105 supports a mass repository containing logs that contain all events having occurred with respect to cloud data management and operations. In this example, tenants 114 (a-d) are part of an organization or group sharing tenant network 102. However, a tenant may represent a single entity operating one computing appliance without departing from the spirit and scope of the present invention. In one embodiment, components illustrated in trusted third-party network 101, may instead be implemented on client servers or computing appliances as part of the client application thereby eliminating any third-party dependencies. In one embodiment, tenants may vest different levels of trust on the service provider and may therefore instill varying degrees of security constraints to be imparted to their virtual instances. Tenants who trust the service provider the most would require the lowest degree of security where as tenants who want to host mission-critical data would put a least amount of trust on the service provider and therefore require higher levels of security. The token security regimen of the invention has the flexibility to enforce security on demand and according to varying trust models subscribed to by tenants.

Figure 2:
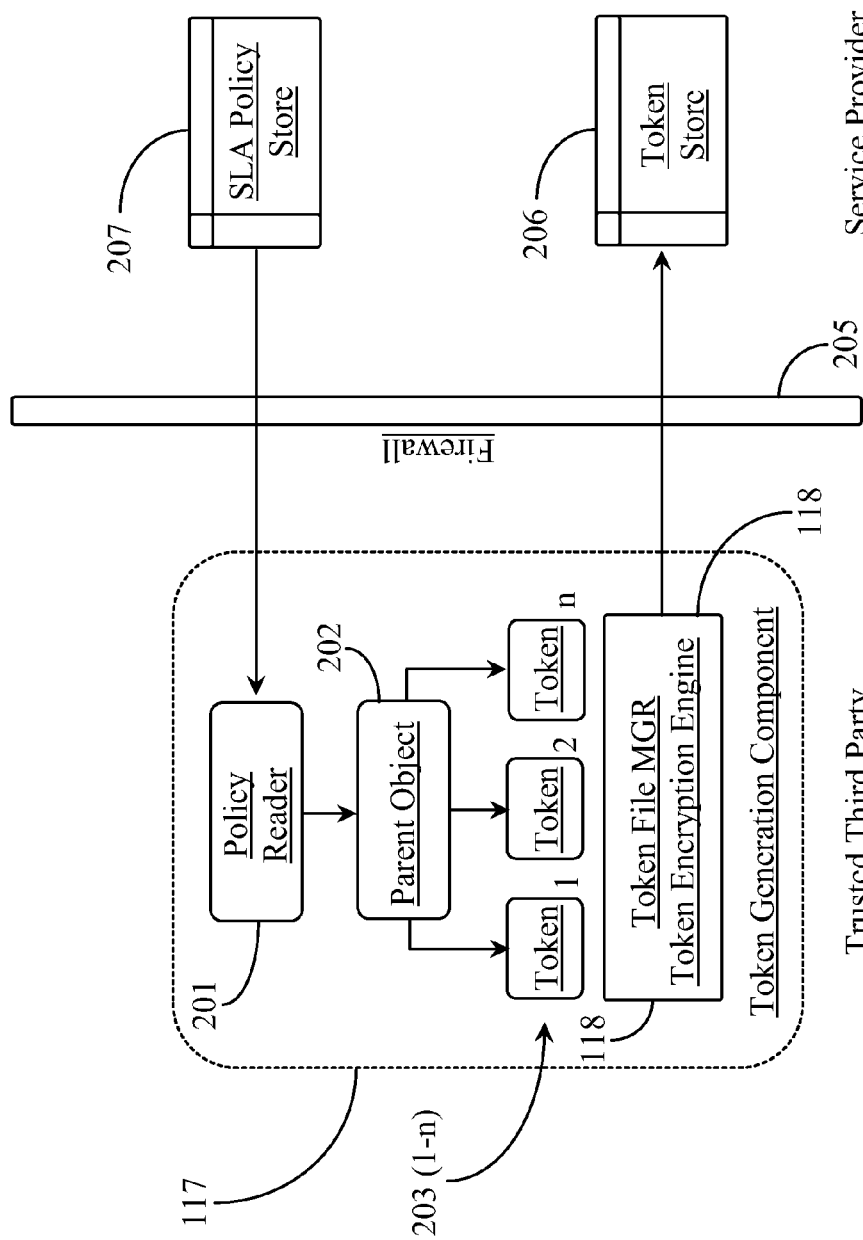
FIG. 2 is a block diagram illustrating basic components of software 117 of FIG. 1.

FIG. 2 is a block diagram illustrating basic components of software 117 of FIG. 1. SW 117 is hosted by a third-party trusted by both tenants and the service provider to provide token generation, encryption (if applicable), and secure policy generation. The trusted third party is separated from the service provider by a secure firewall insuring that the service provider plays no role in token generation or in the initial phases of post generation token management.

SW 117 is referred to as a token generator in this example. Token generation software 117 is also termed a SEDO access control manager (SACM). SW 117 takes a formalized SLA between a tenant and the service provider as input to generate tokens for a tenant. The service provider may send a digital copy of an SLA held in policy store 207 to the trusted third party for evaluation. A policy reader 201 automatically parses the SLA in this example. In one embodiment, SLAs may also be reviewed by a knowledge worker or authorized administrator. Policy reader 201 isolates all of the data operations that are permitted in the policy along with all of the rules and constraints governing each operation.

To generate a token, SW 117 begins with a parent object 202. Parent object 202 is termed a client security enabled data object component (CSEDOC) by the inventor. The parent object is an object model that includes all of the possible service attributes and methods including data operations, rules, constraints, and security levels that the service provider includes in its service to cloud tenants. Tokens are generated from parent model 202 according to SLA interpretation by policy reader 201. In this example tokens 203 (1-n) are child instances of parent object 201.

SW 118, termed a token manager, manages tokens generated by SW 117 in terms of immediate post generation tasks. Token manager 118 is responsible for encrypting tokens (if applicable) and for generating and encrypting (if applicable) a hash value for each generated token and then embedding the hash within the token data. During use, the hash values embedded within each token are compared to rehashed values generated within the DOM 0 kernel during token activation to validate the integrity of the token, more particularly that the token has not been tampered with by the trusted third party or by the service provider during inactive storage or in transit. In this example, the hash is generated from the operation description or content description of the token.

In one embodiment, mapping of tokens and token attributes to policy attributes are contained in an extensible markup language (XML) file. A unique session identification (SID) may be generated each time a token is used to complete operations relative to a new request by the service provider or by the tenant. SID assignment may be performed at the location or domain of the service provider. In one embodiment, token generator SW 117 provides a summary machine-readable version (policy definition) of the formalized SLA policy that may be stored along with or separately from the generated tokens for each tenant. The policy may be used as a reference map when accessing tokens for use. For example, if a request comes into the system that requires a token for permissions, the service provider may access the service policy to determine if a token exists for the request. The policy definition verifies whether the requested token operations are permitted and if a token was generated and is available in storage and that is valid for use in enabling performance of those operations.

In this example, the generated tokens are reusable tokens that are incorporated with a TTL clock. The TTL clock is activated during use of the token by the service provider. The token only permits its stated operation(s) during the active TTL state of the token. When the TTL expires, the operation(s) authorized by the token should be completely performed. The token is deactivated when the TTL expires and any operations running during this period must be forced to complete or shut down before the expiration point in time. In a preferred embodiment, token management SW 118 brokers tenant and service provider signing of each generated token verifying that both recognize the validity of each generated token to be used to permit specified data operations. Token are signed using private keys, one for the tenant and another for the service provider. Generated tokens with signatures are sent to the service provider in encrypted or non-encrypted format and stored in a token store 206 maintained by the service provider.

In one embodiment, SW 117 may be incorporated in the generation of tokens for use with ad-hoc requests representing requests for performing one or more operations on data wherein those specific operations were not included in the formalized SLA. In this case, the tenant may have some control over whether the ad-hoc tokens will be made reusable or slated for destruction after one-time use. In a third-party example, the tenant is also separated from the trusted third-party by a firewall.

Figure 3:
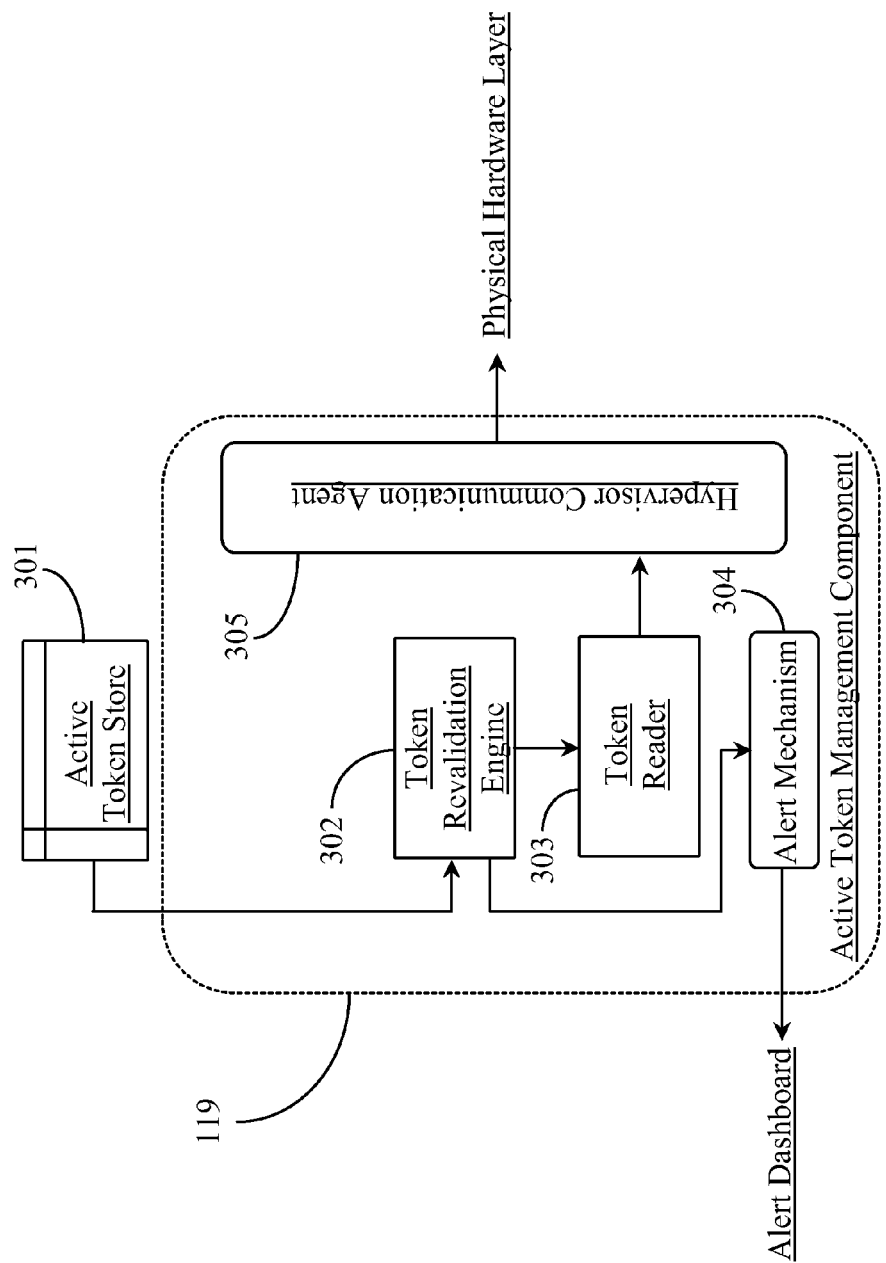
FIG. 3 is a block diagram illustrating basic components of software 119 of FIG. 1.

FIG. 3 is a block diagram illustrating basic components of software 119 of FIG. 1. SW 119 is termed a SEDO manager and is an active token management component that provides at least one method for initiating at least one operation on cloud data based on leveraging a token to gain permission for performing the operation(s). When a request to perform an operation arrives at the system on the provider network, the provider accesses the machine-readable policy of the tenant subject to the request to determine if there are any tokens stored in the token/policy store that permit the operation(s) defined in the request. If a token exists, the service provider may access the token from the token store 206 and may assign a SID for that token. The token may be moved to active token store 301 representing a queue of sorts for tokens that are active and ready for processing.

Active tokens are extracted from active token store 301 for further processing and implementation. In this example, the generated token and request is sent to a token revalidation engine 302. Token revalidation engine 302 generates a hash value from the description of token operation(s) and compares the value with the embedded hash generated by the third-party token generator module. This process insures that the token was not altered or otherwise tampered with before implementation to permit one or more data operations defined by the token. If the token revalidation engine does not get a match of the hash values, it may cause an alert to be sent to the tenant via an alert mechanism 304. Token validation is performed in the DOM 0 kernel.

The alert sent to a tenant may be sent directly, or through proxy service, to the tenant's alert or notification section in the tenant's client dashboard application. SW 119 includes a token reader 303 that parses the data operation(s), and any constraints associated with the operation. For example, one constraint might be a level of encryption to be performed on cloud-computing data associated with a tenant's level of trust of the service provider for that operation(s). If the hash values match and all other parameters are correct for a token, the token reader may pass the token along to a hypervisor communication agent 305. Hypervisor component 305 communicates the operation(s) requested and defined in the token to the physical hardware layer through the hypervisor layer of the cloud-computing platform.

In order to implement the above concept in empirical testing, the following development bed has been prepared and the specification uses XEN Hypervisor v4.0.1 (neXt gENeration Virtualization), Dom0 running on Ubuntu, which is a modified Linux Kernel v2.6.32.45-pv, and Cloud Platform XCP 1.0 (XEN Cloud Platform). The inventors selected XEN hypervisor because it is one of most widely accepted and used open source hypervisor layers. It is the fastest and most secure infrastructure virtualization solution available today supporting a wide range of operating systems and various versions of Berkeley Software Distribution (BSD) operating systems. An important consideration is that the source code is available for it to be modified to incorporate this new secure software layer of the present invention. The SEDO layer interprets all requests before the requests reach the hypervisor layer for execution.

Tokens are extracted from a secure token store, unwrapped and validated before the rules and operations embedded in the token are applied. Once validated and authorized by the SEDO layer the control is passed back to the hypervisor layer for execution. In one embodiment, tokens are stored in a non-encrypted state but are signed by both tenant and service provider. In another embodiment tokens are stored in an encrypted state. In one embodiment two or more encryption levels are available for the tenant to select from regarding encryption of data in general including token encryption and policy definition encryption.

Figure 4:
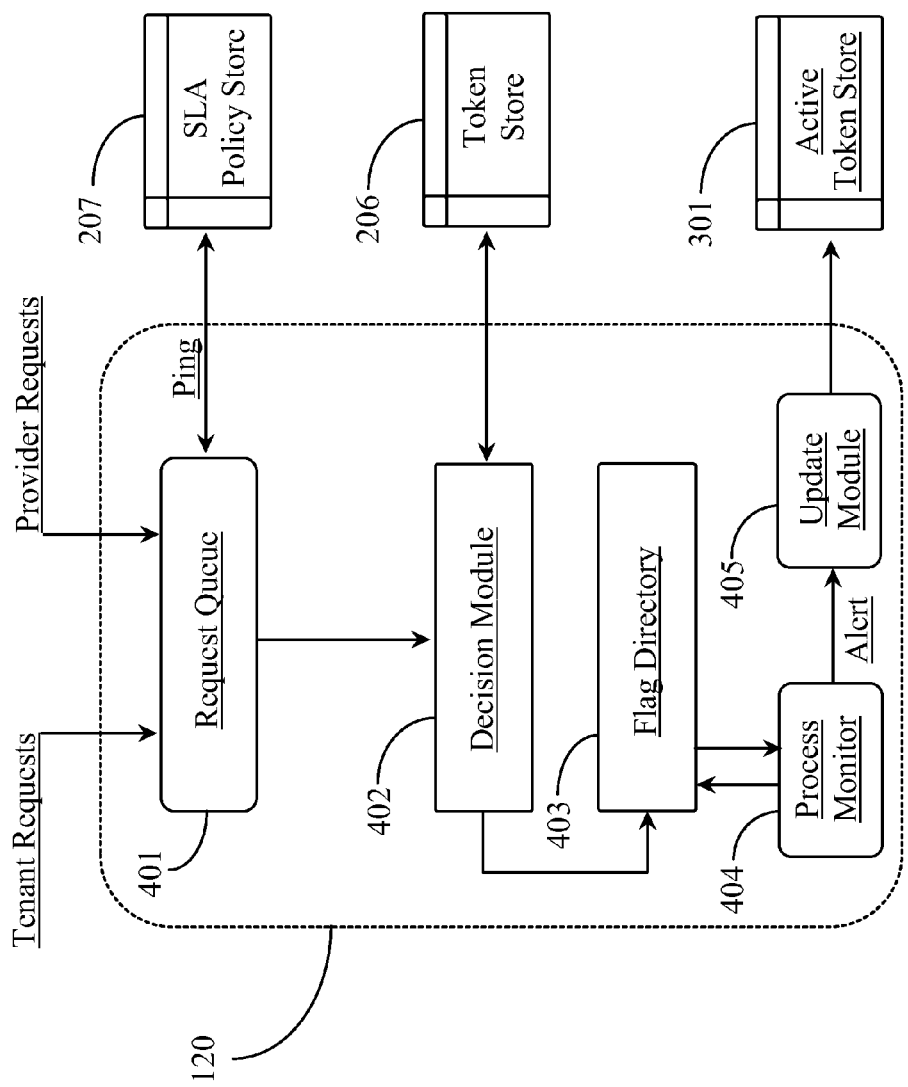
FIG. 4 is a block diagram illustrating basic components of software 120 of FIG. 1.

FIG. 4 is a block diagram illustrating basic components of software 120 of FIG. 1. SW 120 is termed a SEDO policy management module by the inventors. SW 120 ensures that requests received from the cloud provider are crosschecked against agreed policies. If the policy supporting the request exists then the policy manager uses a token mapping table to extract the appropriate token and passes it to the kernel for further processing.

In this example, tenant and provider requests arrive to a request queue 401. When a next request is processed, the SLA policy store 207 may be pinged to access the policy covering the request on behalf of the tenant's data. If no policy exists that supports the request, the cloud tenant is immediately notified through the alert dashboard in the client application (121). A decision module 402 may be provided that functions to connect policy with a token. For example, if policy review determines the request is permitted, a token mapping table may be accessed to retrieve the appropriate token from token store 206. If the request is not supported by the existing policy for that tenant and request, then the tenant may be provided an opportunity to approve the request (provider request).

If the request is a tenant request that is not currently supported by policy, the tenant may be given the opportunity to have the operations subject of the request performed as an ad-hoc or one time request. In both cases, a new token may be generated and approved by the tenant that may be used to authorize and enable performance of the operations subject of the request. Decision module 402 is responsible for ascertaining the states of the request and formulating certain tasks including tenant notification and new token generation (if needed).

When the provider or the tenant submits a request, the request is checked against the policy store 207. If the request is supported by pre-agreed policy as determined by decision module 402, then the corresponding token (SIT) is extracted from token store 206. If the request is not supported an alert is sent to the alert section in the client dashboard application (121). The tenant may then make a decision whether to approve the providers current requested action on the tenant's data. If the tenant approves the request from the service provider then the corresponding token (SIT) is generated by the token generator module (117) and passed onto the policy management module (120). The request, in this case, may be approved as a repeatable operation or set of operations calling for a reusable token that is generated and deposited in the token store. If the request is just an ad hoc request then the generated token is not stored in the token store.

A token generated for an ad hoc request may have a flag set for it using a flag directory 403 listing tokens generated for ad hoc requests. As new tokens that are not reusable arrive to be acted on, a flag is dumped onto flag directory 403. This directory is pinged constantly by a process watcher or monitor 404 which will then insert the token into an active token store 301 located at the providers domain within the SEDO manager component 119. An update module 405 is provided for introducing the new token into the active token store. The SEDO manager component in the provider domain revalidates the token by regenerating the hash value for comparison to the hash embedded within the token when the token was generated.

The SEDO manager passes the token to the SEDO-hypervisor communication agent who in turn performs the operations of the request. Another process monitor (not illustrated) provided within the hypervisor communication agent tracks the TTL of the token and the results of the actions performed on the cloud data. When a token is released from the active token store, its internal timer (TTL) will start automatically. The token will self-destruct (ad hoc token only) when the TTL window encoded within the token has expired. In this way, a token cannot be reused after the intended operation(s) are accomplished. In the case of a reusable token, the token becomes benign at the end of the TTL and cannot be reused unless reactivated through another request. A new session identification (SID) is associated with each token activated to permit a data operation or operations. The TTL parameters for a token give the system enough time to perform the stated operations but not enough time to be reused for the same operations.

Figure 5:
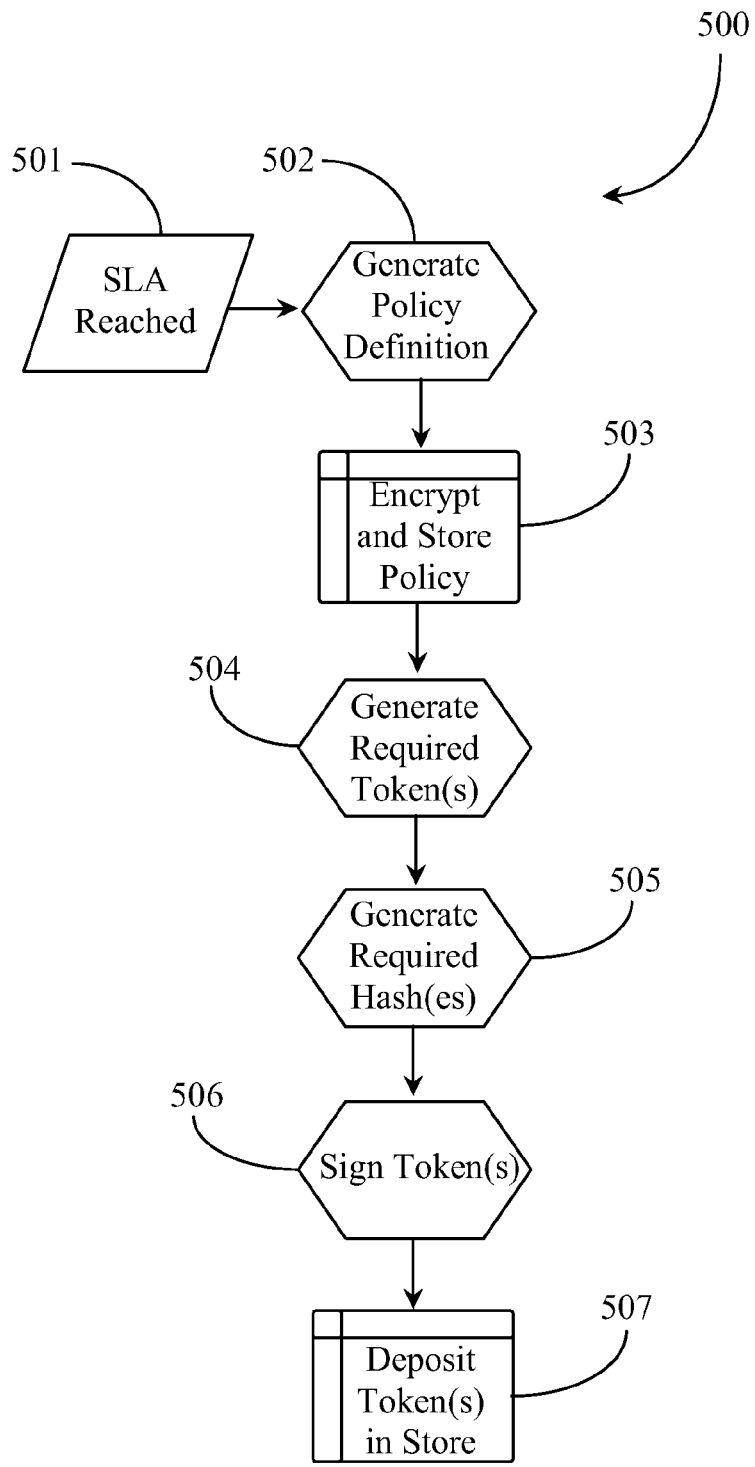
FIG. 5 is a process flow chart illustrating steps for generating secure intelligent tokens from a secured policy definition according to an embodiment of the present invention.

FIG. 5 is a process flow chart 500 illustrating steps for generating secure intelligent tokens from a secured policy definition according to an embodiment of the present invention. At step 501, a cloud computing tenant and a service provider of cloud computing services reach a service level agreement (SLA). The SLA contains detailed descriptions of all of the operations, rules and constraints that govern service provision and tenant consumption of services. At step 502, the SLA is sent to a trusted third-party operator for interpretation and generation of a machine-readable policy definition summarizing or listing the permitted operations, policy rules, and constraints associated with those operations. Policy definition at step 502 may include constraints or rules that govern what operations may be performed on the tenant data, who may perform those operations, and when and how those operations may be performed. The policy definition may also list all of the tokens that will be generated for permitting the listed operations.

The policy definition generated at step 502 from SLA input received at step 501 is encrypted and stored for later access at step 503. At step 504, tokens are generated to enable initiation and performance of individual operations or sets of operations defined in the policy definition generated and stored at step 503. The generated token(s) may reside in the same data store as the policy definitions in one embodiment. In one embodiment, when a request is raised, the policy definition is accessed in order to first validate that the requested operations are permitted on tenant data under the policy, and to locate the correct tokens associated with the policy for performing those operations. Tokens are generated based on a parent object model that contains all of the permitted operations, permissible data states, permissible locations of data residency, rules, constraints, and other like attributes. All tokens inherit their operational attributes from the parent object model.

At step 505, the tokens are hashed relative to their description and/or content attributes. The hash values generated are unique for each token and are embedded in the token data for later validation purposes. At step 506, the service provider and the tenant sign the tokens using private keys provided to or otherwise secured by them at step 506. Generated tokens are stored in a token storage at step 507 for latter use in authenticating data operations performed on tenant cloud data. In one embodiment, a trusted third-party operator protected by secure firewall from provider or tenant access performs steps 502 through 507. In one embodiment, process 500 further includes a step before step 507 for embedding a TTL clock into the token. In this case, the TTL governs the time of life of the token during active state (the token being leveraged to authenticate data operations).

TTL is the time allotted for performing the operation(s) relative to a token. Therefore for any token, the TTL shall be sufficient to perform the operations permitted by the token but not great enough to repeat such operations. Thus, a token may only be active during performance of the cloud-data operations allowed by the token and supported by policy. In this exemplary process, it is determined that the tokens are reusable tokens generated from pre-agreed policy and not tokens generated on the fly as a result of an ad hoc request approved by the tenant and provider. The token store and the policy store may be co-located on the same repository without departing from the spirit and scope of the present invention.

Figure 6:
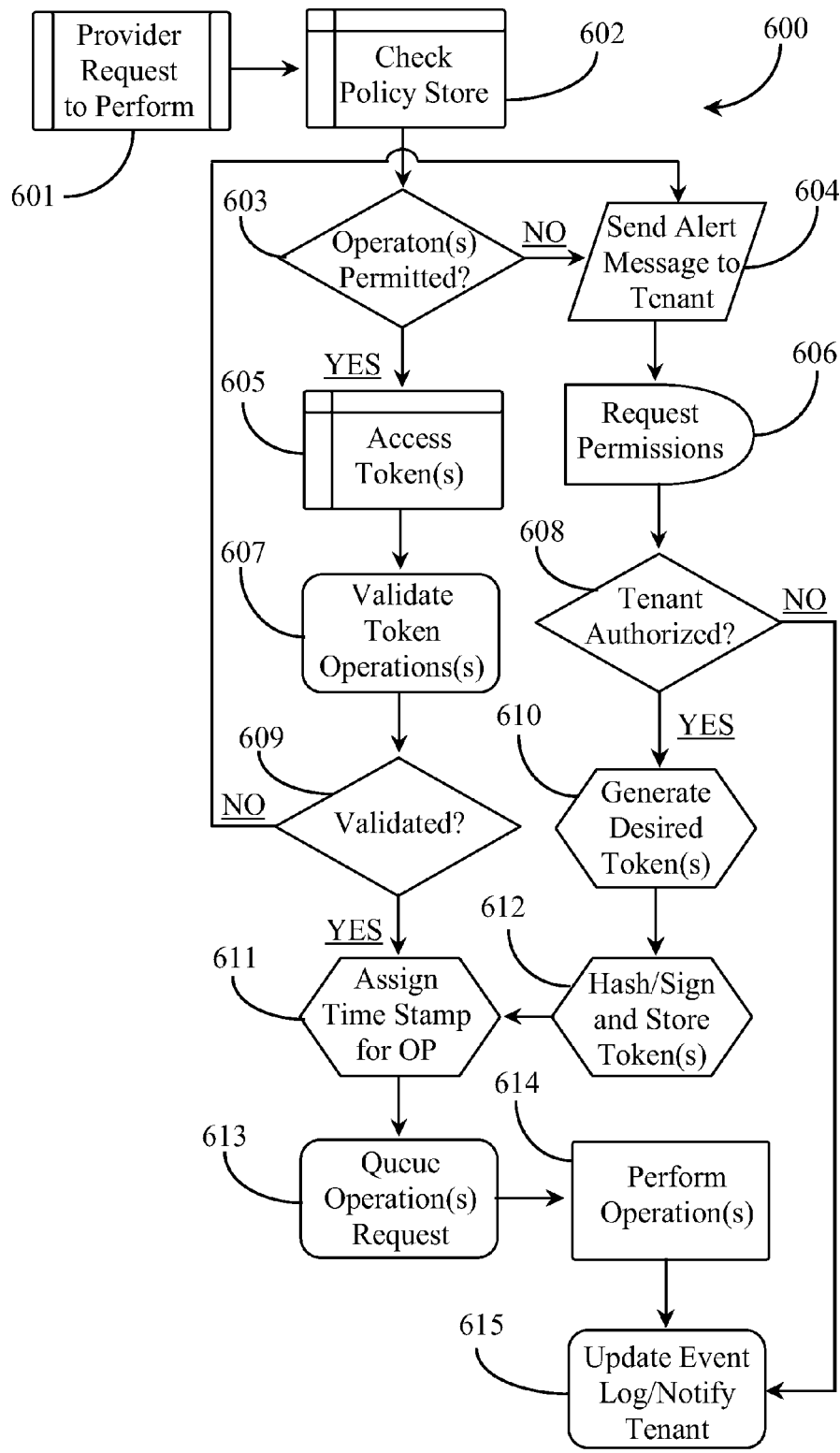
FIG. 6 is a process flow chart illustrating steps for validating an operation performed on cloud data using a secure intelligent token according to an embodiment of the present invention.

FIG. 6 is a process flow chart 600 illustrating steps for validating an operation performed on cloud data using a secure intelligent token according to an embodiment of the present invention. At step 601, the system receives a request submitted by a service provider of cloud-computing services to perform one or more data operations on tenant data stored on the cloud. The system checks a policy store containing machine-readable policy definitions to access the policy definition covering all of the permitted operations and constraints associated with operations performed on the tenant's data.

At step 603, the system determines whether the policy definition permits the operation or operations that are subject of the received request. If the system determines that the operations are permitted under the policy definition at step 603, the system finds and accesses the required token or tokens covering the operation(s). The system may access a table that lists the pre-signed token or tokens that permit the operations. The system may then validate the tokens integrity and operations at step 607. The system may generate a hash value from token description that is compared with an embedded hash value generated from the same data at the time that the token was created from a parent object.

At step 609, the system determines if the token is valid (has not been tampered with). If it is determined at step 609 that the token is valid, then the system may assign a time stamp to the token or TTL parameter that governs the time frame within which the operation(s) described by the token(s) must be initiated and completed. A single token may encapsulate one or more data operations. Moreover, more than one token may be accessed and activated for a tenant from a single request without departing from the spirit and scope of the present invention. In one embodiment, a TTL for a token is created and made part of the token (embedded) at the time of token creation.

The system may queue the operation request and accompanying token(s) for processing at step 613. Tokens may be deposited for processing in an active token store. Flags may be set for each queued token to define the operating state of each token. A process watcher or monitor may pass the token(s) onto the hypervisor layer for initiation and performance of the permitted operations at step 614. At step 615, the system may update an event log for the tenant and notify the tenant of the current state of operations and when those operations are completed.

If at step 603, the system determines that the request is not supported by the existing policy definition, the system may immediately alert the tenant by sending a message or notification to the tenant at step 604. Such a notification will convey to the tenant that the policy definition did not support the operation(s) subject of the request received in step 601. At step 606, the system may request permission from the tenant to perform the data operations that were not permitted under the policy definition. At step 608, the tenant makes a decision whether to authorize the operations or not to authorize those operations.

If the tenant determines not to authorize the service provider's request, the process may terminate at step 615 for that request. The event is logged at the tenant and the tenant is notified that the request was formally denied. The service provider may also record the event. If the tenant authorizes the operation(s) at step 608, one or more tokens may be generated at step 610 that cover the operations requested. The requested operations must be included in the attributes of a parent SEDO object for normal token generation. At step 612, the token(s) are hashed, signed by both parties, and queued for service at step 612. This process is similar to the process for pre-generating tokens except that the new tokens are not stored as reusable tokens unless the tenant requests the new operations as part of the regular cloud network service model and the policy definition is updated to reflect the new operation permissions.

The process may then move to step 611 wherein the tokens are assigned a TTL to constrain the operation(s) to be performed within the specified time frame. This process is performed by the token generator in one embodiment. All of the suggested time frames may be detailed in the parent object as attributes to covered data operations. Time frames for tokens containing multiple data operations may have more than one TTL, for example, a TTL for each operation to be performed. TTLs for specific operations may be summed to cover a set of operations to be performed leveraging one token. The process then moves to step 613 where the new token(s) are queued for processing. At step 614 the operations defined within the token are performed and at step 615, the process ends for that request with logs updated and notification of completion and results of the operation forwarded to the tenant.

If at step 609, the token(s) could not be validated by comparing hash values, it may be an indication that the request is from an unauthorized entity or that the original token was tampered with or was corrupted in some way. In this case a notification is immediately sent to the tenant at step 604. The tenant may or may not be presented an opportunity to permit the operations on the fly as evidence of tampering or false request may lead to an increase in security protocols used to prevent such malicious intent. The important aspect is that no data operations are permitted unless they are covered by policy definition and pre-agreed to (existing valid token), or agreed to on the fly with full generation of one or more new tokens to permit those operations within the allotted time windows.

Figure 7:
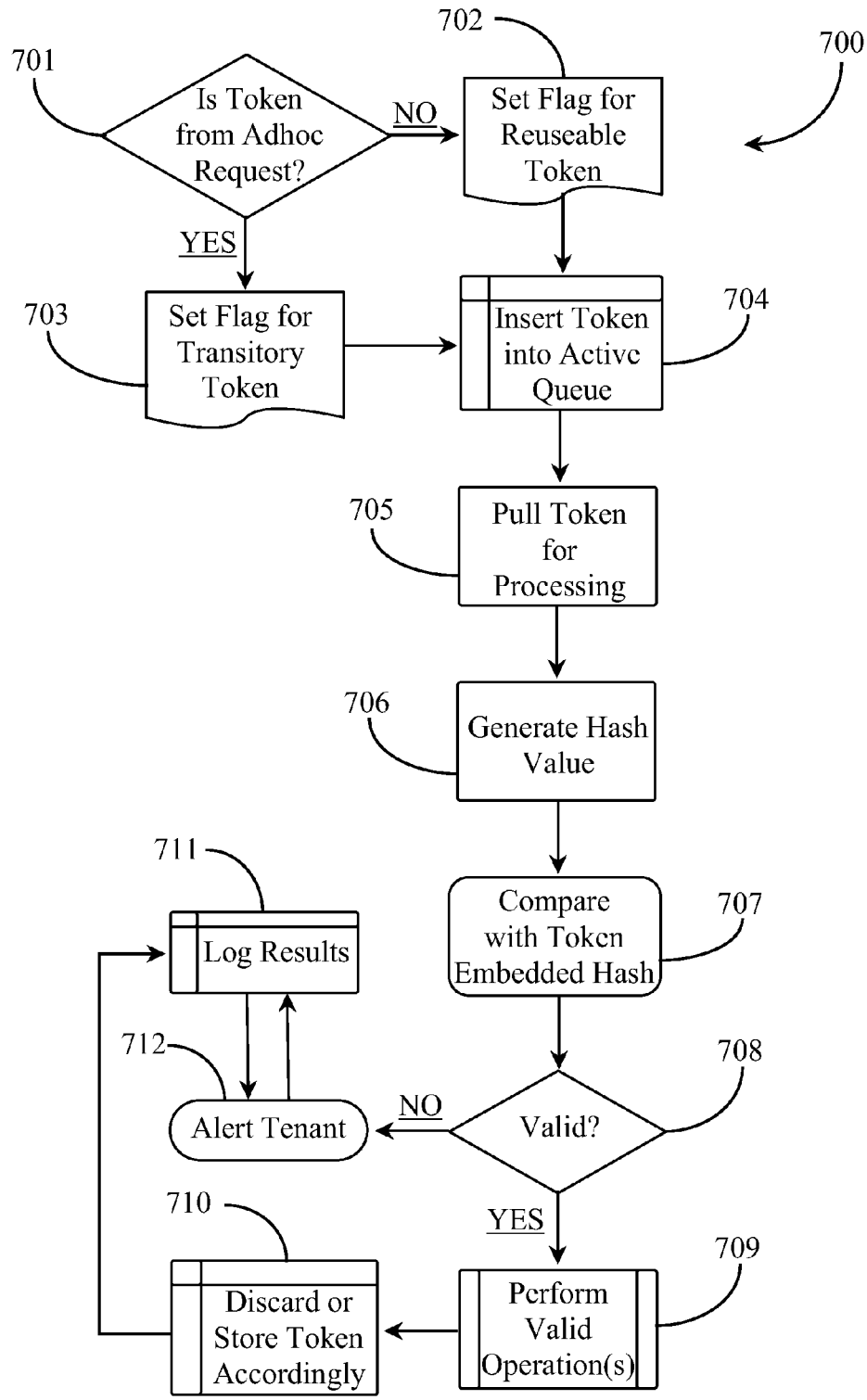
FIG. 7 is a process flow chart illustrating a process for differentiating between a transitory token and a reusable token for validating an operation performed on cloud data according to an embodiment of the present invention.

FIG. 7 is a process flow chart 700 illustrating a process for differentiating between a transitory token and a reusable token for validating an operation performed on cloud data according to an embodiment of the present invention. In this process, it is assumed that a request was received for which no existing token was found and that the tenant approved generation of one or more new tokens to handle the request.

In this case, the system may determine at step 701 if the new token(s) is generated from an ad hoc request. An ad hoc request defines a request that specifies one or more data operations to be performed on demand or one time. An ad hoc request may be submitted by the tenant or by the service provider. If the system determines at step 701 that the token(s) is from an ad hoc request, the system may set a flag associated with the token for a state of a transitory token at step 703. A transitory token is one that is used once and destroyed after use and is not reusable for future data operations.

The transitory token may then be stored or queued for use at step 704. At step 705, the system may access the token(s) in order to perform the data operations specified in the token(s). The system may generate a hash value for the transitory token at step 706, and then it may compare that value at step 707 with the embedded hash value generated when the token was created. At step 708, the system determines if the new token(s) is valid. In one embodiment, tokens generated on the fly for one time use may not be required to contain a hash for comparison as there may be a much lower risk of tampering with a transitory token compared to one that is reusable and stored in an inactive state. However, in one embodiment all tokens must contain an embedded hash value when they are created from the parent object regardless of the type of token being reusable or transitory.

At step 708, the system determines if the newly generated token is valid or not according to the results of hash generation and comparison in steps 706 and 707. If the system determines that the token(s) is valid at step 708, then the system performs the stated operations of the token on the tenant's cloud data at step 709. If at step 701, the tenant has marked the token as a reusable token, then a flag may be set for the token identifying the newly generated token(s) as reusable. The process then resumes through steps 704 through 708 as previously described for a transitory token(s).

In any case, at step 708, if it is determined that the token(s) are not valid through hash comparison, then the tenant is immediately alerted at step 712. The process may then end for the request with logging of the events performed at step 711. If the system determines that the token(s) are valid at step 708, the system moves to perform the valid data operations at step 709. After the operations are performed the token(s) may be discarded or stored at step 710 according to the determination made at step 701. The system may then log results at step 711 and notify the tenant of the completed operation(s) at step 712.

It will be apparent to one with skill in the art that implementing the methods and apparatus of the present invention may avert typical threats that may occur in a cloud-computing network. For example, many government and corporate security policies insist in the practice of resource sharing with certain trusted parties of the network. It is possible that these bodies may mismanage the co-existence of virtual machine (VM) instances per the SLA so that non-trusted cloud tenants share the same resources used by the government and large corporate bodies.

All trusted parties are identified in the generated policy definition and only those trusted cloud tenants are allowed to share the underlying resources allocated to computing of government or corporate data. The underlying control and management platform along with the policy management module in the hypervisor kernel checks the policy definition and will ensure that the government or corporate VM instances are launched along with previously agreed trusted cloud tenants only. If an attempt is made to violate this rule while launching VMs, the token will block such moves because they are not specified in the token operations. The system immediately alerts the cloud consumer of such attempts that fail because they were not permitted by the token content.

In another exemplary use case, a tenant may have entrusted the service provider to do a daily back up of tenant data at a predefined time. There exists a possibility that the administrator may take an entire duplicate copy of the tenant's data and sell it to a competitor or for other malicious reasons. In order to prevent this malicious intent, the token defining the backup operation defines the time of day for performing the operation and the TTL specifies the time needed to perform the backup. The token can be configured to deliver logs that carry varying levels of detail depending on the critical nature of the process that is being initiated. This way the token will ensure that the backup operation is done once on the tenant's data at the required time and within the defined time frame of the TTL. Further attributes may be inherited by the token as per the service level agreement that specifies the intended source database or server hosting the data that requires backup and the destination device, network, or machine to accept the backed up data. Without a token the service provider administrator is not able to perform any actions that are not specified as permitted under the SLA. Every time such requests are raised the proposed operations are checked against the policy store to ensure that the requested action is legitimate and is as per the prearrangement agreed at the time of SLA sign off.

It will be apparent to one with skill in the art that the token security system and methods of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for protecting data managed in a cloud-computing network from malicious data operations comprising:
    an Internet-connected server hosted by a service provider providing the cloud-computing network;
    an Internet-connected computer appliance operated by a tenant of the cloud-computing network;
    a third party generating security tokens that both the tenant and the service provider trusts to generate security tokens; and
    software executing on the server from a non-transitory physical medium, the software:
        providing a control interface enabling a tenant access to and control over data owned by the tenant and cloud-computing services;
        generating a policy definition according to a service level agreement (SLA) for the tenant, wherein security tokens are generated to enable initiation and performance of individual operations or sets of operations defined in the policy definition;
        ordering or accessing from a token store one or more security tokens, the tokens generated at least from the SLA for the tenant, having stored data including defining the scope of services offered, detailing all permitted operations that may be performed relative to the tenant's data and identifying who may perform the operations that validate one or more sets of computing operations defined in the policy definition to be performed on the data owned by the tenant;
        generating a hash for each token generated, the hash detailing, in a secure fashion, the computing operation type or types embedded in the one or more tokens;
        brokering two-party signature of the one or more tokens, wherein the tenant and service provider sign the one or more tokens; and
        dynamically activating the one or more signed tokens for a specific time window, the time window selected based upon time required to perform the operations permitted by the token, the operations prevented with expiration of the time window;
    wherein the tenant receives an alert at the control interface wherein an unauthorized request for one or more data specific operations on the tenant data is received outside of the policy definition in accordance to the SLA, and the tenant interacts with the control interface to deny the request or approve the request to perform one or more specific operations on the tenant data by at least generating one or more new security tokens enabling performance of the request, thereby modifying the policy definition in accordance to the SLA to reflect the data operations related to the request stored in the SLA.

2. The system of claim 1, wherein the cloud-computing network is a public network based on an Infrastructure as a Service (IaaS) model.

3. The system of claim 1, implemented in a virtual machine monitoring layer.

4. The system of claim 3, further integrated into a Dom0 system kernel.

5. The system of claim 1, wherein the available computing operations attributed to the one or more generated tokens are pre-defined attributes of a parent object model, the operations agreed to in the service level agreement (SLA) between the cloud computing tenant and the cloud computing service provider.

6. The system of claim 1, wherein the one or more generated tokens are stored in an inactive and signed state until they are required to validate a requested operation.

7. The system of claim 1, wherein one or more of the tokens are reusable tokens that are uniquely identified at each instance of use.

8. The system of claim 1, wherein the one or more dynamically generated new security tokens are added to the token store containing the pre-negotiated tokens, the one or more tokens incorporating one or more new operations into the SLA as one or more modifications.

9. The system of claim 1, wherein the one or more tokens are signed using privately held keys.

10. The system of claim 1, wherein the hash for each token is compared to an embedded value of the hash to validate the content and operation integrity of the token before activation for use.

11. The system of claim 1 further including a function for validating one or more tokens for operation against a pre-negotiated list of permitted operations in the SLA policy governing the provider/tenant relationship.

12. A method, provided by software executing from an Internet-connected computerized server, for securing against internal malicious operations against data stored on a cloud-computing network comprising the steps:
    providing a control interface enabling a tenant access to and control over data owned by the tenant and cloud-computing services;
    generating a policy definition according to a service level agreement (SLA) for the tenant, wherein security tokens are generated to enable initiation and performance of individual operations or sets of operations defined in the policy definition;
    ordering or accessing from a token store one or more security tokens, the tokens generated at least from the SLA for the tenant, having stored data including defining the scope of services offered, detailing all permitted operations that may be performed relative to the tenant's data and identifying who may perform the operations that validate one or more sets of computing operations defined in the policy definition to be performed on the data owned by the tenant;
    generating a hash for each token generated, the hash detailing, in a secure fashion, the computing operation type or types embedded in the one or more tokens;
    brokering two-party signature of the one or more tokens, wherein the tenant and service provider sign the one or more tokens; and
    dynamically activating the one or more signed tokens for a specific time window, the time window selected based upon time required to perform the operations permitted by the token, the operations prevented with expiration of the time window;

wherein the tenant receives an alert at the control interface wherein an unauthorized request for one or more data specific operations on the tenant data is received outside of the policy definition in accordance to the SLA, and the tenant interacts with the control interface to deny the request or approve the request to perform one or more specific operations on the tenant data by at least generating one or more new security tokens enabling performance of the request, thereby modifying the policy definition in accordance to the SLA to reflect the data operations related to the request stored in the SLA.

13. The method of claim 12, wherein the cloud-computing network is a public network based on an Infrastructure as a Service (IaaS) model.

14. The method of claim 12, wherein the available computing operations attributed to the one or more generated tokens are pre-defined attributes of a parent object, the operations agreed to in the SLA between a cloud computing tenant and a cloud computing service provider.

15. The method of claim 12, wherein the one or more generated tokens are stored in an inactive and signed state until they are required to validate a requested operation.

\* \* \* \* \*